| United States Patent [19] | [11] Patent Number: 4,678,607 |
|---|---|
| Reitz | [45] Date of Patent: Jul. 7, 1987 |

[54] ETHYLENE COPOLYMERS WITH ENHANCED FIRE RESISTANT PROPERTIES

[75] Inventor: Robert R. Reitz, West Chester, Pa.

[73] Assignee: E. I. Du Pont de Nemours and Company, Wilmington, Del.

[21] Appl. No.: 889,470

[22] Filed: Jul. 25, 1986

[51] Int. Cl.[4] .................... C09K 21/02; C09K 21/10; C09D 5/18
[52] U.S. Cl. ................ 252/609; 106/18.11; 252/7; 252/606; 428/921; 523/179
[58] Field of Search .............. 252/60, 606, 609, 2, 252/4, 7, 5; 428/920–921, 36, 384; 106/15.05, 18.11; 524/269; 526/352; 523/179; 174/110 SR, 121 A

[56] References Cited

U.S. PATENT DOCUMENTS

| 3,513,114 | 5/1970 | Hahn et al. | 252/606 |
| 4,430,470 | 2/1984 | Taniguchi et al. | 252/609 |
| 4,543,281 | 9/1985 | Pedersen et al. | 252/606 |
| 4,549,041 | 10/1985 | Shingo | 252/609 |

FOREIGN PATENT DOCUMENTS

0170176  9/1984  Japan .................... 252/609

*Primary Examiner*—John F. Terapane
*Assistant Examiner*—Howard J. Locker

[57] ABSTRACT

The addition of melamine/formaldehyde resins causes ethylene copolymers containing $CaCO_3$ and alumina trihydrate to have lower swell on burning and has smaller and more uniform cell formation in the ceramic ash than compositions without such resins present.

3 Claims, No Drawings

ETHYLENE COPOLYMERS WITH ENHANCED FIRE RESISTANT PROPERTIES

BACKGROUND OF THE INVENTION

Flame retardant ethylene copolymer materials have long been the subject of research in the flame retardant field, and a number of materials using a number of flame retarding techniques have been developed.

One class of such materials achieves flame retardancy and flame barrier protection by decomposing when subjected to intense heat and high temperature, to form a rigid foam of ceramic ash composed of numerous cells. The cells provide a barrier against heat transfer. In addition such materials are formulated to also release water vapor during the decomposition and cell formation, which also serves to retard spread of fire.

Such materials, which are described in Pedersen U.S. Pat. No. 4,543,281 comprise an ethylene copolymer base or matrix which contains alumina trihydrate and calcium carbonate or calcium-magnesium carbonate. Under ambient conditions these materials are conventional load bearing, melt processible thermoplastics. Under conditions of high heat or fire, the compositions act as a fire barrier and provide low fuel value and low smoke output. As the material decomposes or burns, the Al and Ca ingredients foam a ceramic ash that has a cell structure. Because of the cell formation as the ceramic ash builds up, the ash becomes a thermal insulator. Potential applications are in fire stops, as insulating conduit, in wire and cable constructions where high temperature circuit integrity is needed, and many other applications such as protection for structural steel I-beams.

SUMMARY OF THE INVENTION

It has now been discovered that the addition of melamine/formaldehyde resins causes these materials to have lower swell on burning and to have smaller and more uniform cell formation in the ceramic ash than compositions without such resins present.

DESCRIPTION OF THE INVENTION

Presence of the melamine/formaldehyde resins causes formation of ceramic ash of small cell structure and lower volume swell. In general, cell size in ash found from the materials of this invention ranges between about 1-2 micrometers. Small cell structure is advantageous because there is less chance for structural failure.

In a preferred embodiment, the compositions of this invention are fire retardant and fire barrier materials which comprise
 (a) a matrix comprising 10-40 percent by weight of at least one ethylene copolymer,
 (b) 35-89 percent by weight of compositions (a), (b), and (c) of a mixture of
  (i) alumina trihydrate and
  (ii) calcium carbonate or calcium-magnesium carbonate or both, said mixtures containing a percent weight ratio of (i) to (ii) of 30/70 to 70/30, and
 (c) 1-25 percent by weight of composition of (a), (b), and (c) of a melamine/formaldehyde resin.

The ethylene copolymer matrixes used in the compositions of the invention are comprised of about 40-95% by weight ethylene, preferably 45-90% and most preferably 60-85%. A comonomer or a mixture of comonomers comprise the remainder of the copolymer. Examples of comonomers include vinyl esters of carboxylic acids of 2-18 carbon atoms, such as vinyl acetate; esters of unsaturated carboxylic acids or diacids of 4-18 carbon atoms such as methacrylates or acrylates; and alpha-olefins of 3-12 carbon atoms. In addition minor amounts of other polymer units can be present such as carbon monoxide (CO). Examples of copolymers include ethylene/vinyl acetate, ethylene/ethyl acrylate, ethylene/propylene, ethylene/octene, ethylene/methyl acrylate. Where appropriate, as, for example, with the acrylate comonomers, up to 15% by weight CO can be present.

The melt index of the copolymers is generally between 0.1-150 g/10 min, preferably 0.3-50 g/10 min, and most preferably 0.7-10 g/10 min. In addition, mixtures of copolymers can be used. The amount of the ethylene copolymer present will be between about 10-40% by weight of the composition, preferably 15-35% and most preferably 18-30%.

The alumina trihydrate has the formula $Al_2O_3 \cdot 3H_2O$ and is preferably of 1-2 micron average particle size. Larger particles tend to give a larger volume expansion during burning which results in a weaker ceramic ash. Smaller particles, especially those below 0.5 micron, tend to increase viscosity of the composition melt, which reduces processing ease.

The calcium carbonate or calcium-magnesium carbonate will preferably have a particle size of 1-3 microns in diameter. Larger particles tend to result in a weaker ash structure due to less surface available for ceramic sintering. Smaller particles, especially those below 0.07 micron diameter produce a hard ceramic ash, but the foaming during burning is low and the viscosity of the composition tends to be high.

In general the ratio of the alumina trihydrate to the calcium compound will be between a 30/70 and a 70/30 weight ratio preferably 40/60 and 60/40 and most preferably 45/55 and 55/45. The total amount of both in the composition will generally be between 35-89 weight percent of the composition, preferably 50-83 weight percent, and most preferably between 60-78 weight percent.

The melamine/formaldehyde resin increases the flexibility of the composition and reduces the processing viscosity. It unexpectedly acts during burning to produce uniform, small cell structure in the ceramic ash. The amount of resin that can be used will be between 1 and 25 weight percent based on composition, preferably between 1 and 15 weight percent, and most preferably between 4 and 10 weight percent. The melamine/formaldehyde resins are made from melamine and formaldehyde. They can be prepared by production of trimethylol melamine, $C_3N_3(NHCH_2OH)_3$, the molecules of which contain a ring with 3 carbon and 3 nitrogen atoms, and have the $-NHCH_2OH$ groups attached to the carbon atoms of the ring. This molecule can combine further with others of the same kind through splitting-off of water from the hydrogen atom attached to nitrogen and the OH group of another molecule. If present, excess formaldehyde or excess melamine can also react with the trimethylol melamine or its polymers, so that there are endless possibilities of chain growth and cross-linking. The nature and degree of polymerization depends upon pH, but heat is needed for curing.

The compositions can be prepared simply by mixing the ingredients into a melt of the polymer. A commercially sized batch-type Banbury or equivalent intensive mixer is suitable for preparing the compositions of the invention. Dry ingredients are charged in routine fashion. It is convenient in most cases to inject the melamine/formaldehyde resin directly into the mixing chamber as per widely used practice with this type of equipment.

Optionally, the composition may also contain a borosilicate glass to harden the ceramic ash.

In addition, the composition can contain cut fiberglass strands to increase the stiffness of the composition.

An aliphatic carboxylic acid surfactant such as stearic acid can also be added to aid in dispersing the Ca-Al mixture. The surfactant also appears to enhance elongation and increase melt index.

EXAMPLE

The blends described below were prepared in a mixer. All ingredients were added to the mixing chamber at a level which amounted to about 70–80% of the internal volume of the mixer, based on melt. The ingredients were mixed for about 5–10 minutes at a rotor speed adjusted to maintain the temperature between 160°–190° C. The materials were then removed after cooling and then compression molded at 150° C. into shapes necessary for testing.

Four blends were prepared. The ingredients present in each are listed in Table I, along with the properties determined.

Comparative Samples A, B, and C are examples of ethylene/vinyl acetate copolymer (EVA) filled with the minerals taught in U.S. Pat. No. 4,543,281, which also contain "conventional" plasticizers.

TABLE I
THERMOPLASTIC FIRE BARRIER COMPOSITIONS
(Effects of Various Plasticizers)

| Sample Number | Comparative Samples | | | Example 1 |
|---|---|---|---|---|
| | A | B | C | |
| Composition Wt. % | | | | |
| Ethylene Copolymer (Ethylene/vinyl Acetate (75/25) melt index 2.01[1] | 22.5 | 22.5 | 22.5 | 22.5 |
| Aluminum trihydrate[2] | 35 | 35 | 35 | 35 |
| Calcium Carbonate[3] | 35 | 35 | 35 | 35 |
| Stearic Acid | 1.5 | 1.5 | 1.5 | 1.5 |
| Aromatic Processing Oil[4] | 6 | | | |
| Naphthenic Processing Oil[5] | | 6 | | |
| DOP Plasticizer[6] | | | 6 | |
| Melamine/Formaldehyde Resin[7] | | | | 6 |
| Physical Properties Stress-Strain (D1708)[8] | | | | |
| Elongation at break (%) | 440 | 521 | 639 | 571 |
| Yield (MPa) | 2.88 | 2.62 | 2.25 | 2.14 |
| Tensile Strength (MPa) | 2.77 | 3.01 | 3.12 | 3.39 |
| Melt Index[9] (2160 g/190° C.) | 2.06 | 2.56 | 3.01 | 2.09 |
| Flexural Modulus[10] (MPa) | 152 | 137 | 108 | 68 |
| Burning Properties Sample: | a 1 × 3 × .25 in. plaque; burned RT to 1000° C./3 hour | | | |
| Volume Increase[11] (%) | 397 | 340 | 245 | 196 |
| Crush Strength[12] (Pa) | 11 | 37 | 85 | 166 |
| Thermal Conductivity Test Sample[13] Plaque 0.2 in. thick burned above 1000° C. flame; IR Detector | | | | |
| Top Surface Temperature (°C. at 30 min.) Burn Quantification[14] | 405 | 300 | 302 | 302 |
| Limiting Oxygen Index (LOI - the higher, the better fire retardancy) | 31.5 | 32.6 | 33.6 | 42.5 |

Footnotes for Table I
Components:
1. EVA copolymer (25 weight percent VA; 2.01 MI).
2. "Hydral" 710: alumina trihydrate from Alcoa; nominal 1 micron diameter particle size.
3. "Atomite": $CaCO_3$ from Thompson-Weineman Co.; 1–3 micron diameter particle size.
4. "Sundex" 790: aromatic process oil from Sun Oil Co.
5. "Circosol" 4240: naphthenic processing oil from Sun Oil Co.
6. DOP: dioctylphthalate plasticizer.
7. "Cyrez" 933: a melamine formaldehyde resin from American Cyanamide.
Testing:
8. Stress-Strain: ASTM-D-1708, 2 in./min; .125 in. (32 mm) nominal compression molded plaque.
9. Melt Index: ASTM-1238 condition E.
10. Flexural Modulus: ASTM-D-790: .125 in. (32 mm) nominal compression molded plaque.
11. Volume Increase (on burning): a compression molded plaque 1 × 3 × 0.25 in. (2.54 × 7.62 × .63/mm) is placed in a cold muffle furnace. Power is turned on and reaches set temperature of 1000° C. in 45 min. to 1 hour. Sample remains in the oven for a total time of 3 hours. Dimensions (length, width, and height) are measured with a caliper before and after burning. Volume increase is calculated as a percent increase over original volume.
12. Crush Strength: the ceramic ash sample from the above burning (see 14) is tested for compressive strength as follows. On the top crosshead of an Instron Tensile Tester we attach a 1 inch (2.54 cm) diameter rod, pointed down. With a crosshead speed of2 in./min, resistance to the rod pushing through the ash is measured. Resistance to crushing is measured while the rod pushes through the top ⅜ height of the sample. The chart reading in force is divided by the surface area of the rod end (0.785sq. in.).
13. Thermal Conductivity Test: A compression molded plaque 4.5 × 4.5 × 0.2 in. (11.4 × 11.4 × .51 cm) is supported on a ring stand and wire grid above a "Fisher" laboratory burner with a flame temperature of 1000° C. impinging on the bottom surface of the plaque. The top surface temperature of the plaque is monitored using an "Omega" Infrared Pyrometer supported 12 in. (30 cm) above the plaque. Relative insulating ability is indicated by temperature after 30 min. of burning.
14. Limiting Oxygen Index: ASTM-D-2863.

Microphotographs show a uniform small cell size for samples for Example 1 but not for samples of Comparisons A–C. Microphotography at 2X magnification were prepared of cut samples and the largest voids or cells measured. The cells of samples of Comparisons A–C had an average size between 3.5 and 4.5 mm in diameter while those of samples of Example 1 were between 1 and 2 mm in diameter.

The product of Example 1:
1. Shows good thermoplastic properties, e.g., elongation, MI, flexibility.
2 Has low flammability as seen by the Limiting Oxygen Index (LOI).
3. Produces thermal insulating ash when burned at high temperatures (1000° C./3 hours).
4. And unexpectedly shows a controlled, lower volume swell on burning.

This gives a self-supporting ash with much finer cell structure than Samples A–C.

I claim:
1. A flame retardant composition comprising
   (a) a matrix comprising 10–40 percent by weight of at least one ethylene copolymer,
   (b) 35–89 percent by weight of compositions (a), (b), and (c) of a mixture of
      (i) alumina trihydrate and
      (ii) calcium carbonate or calcium-magnesium carbonate or both, said mixtures containing a percent weight ratio of (i) or (ii) of 30/70 to 70/30, and
   (c) 1–25 percent by weight of composition of (a), (b), and (c) of a melamine/formaldehyde resin.
2. The compositions of claim 1 which also contains a low fusion temperature glass.
3. The composition of claims 1 or 2 which also contains chopped fiberglass.